United States Patent
May et al.

(10) Patent No.: US 12,407,156 B2
(45) Date of Patent: Sep. 2, 2025

(54) SEALING SYSTEM AND METHOD FOR EXTERIOR MIRROR

(71) Applicant: Honda Motor Co., Ltd., Tokyo (JP)

(72) Inventors: Hunter May, Columbus, OH (US); Timothy J. Rupp, Dublin, OH (US); Babuji K. Tamarapoo, Powell, OH (US); Hirofumi Takemoto, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 254 days.

(21) Appl. No.: 18/299,488

(22) Filed: Apr. 12, 2023

(65) Prior Publication Data

US 2024/0348033 A1    Oct. 17, 2024

(51) Int. Cl.
*H02G 15/013* (2006.01)
*B60R 1/06* (2006.01)
*B60R 16/02* (2006.01)
*F16J 15/10* (2006.01)
*H02G 3/22* (2006.01)

(52) U.S. Cl.
CPC ............. *H02G 15/013* (2013.01); *B60R 1/06* (2013.01); *B60R 16/0222* (2013.01); *F16J 15/10* (2013.01); *H02G 3/22* (2013.01)

(58) Field of Classification Search
CPC ........ H02G 15/013; H02G 3/22; H02G 15/00; H02G 15/003; H02G 15/007; H02G 15/04; H02G 15/23; H02G 3/24; H02G 3/26; H02G 3/28; H02G 3/30; H02G 3/36; B60R 16/0222; B60R 16/00; B60R 16/0207; B60R 16/0215; B60R 1/06; B60R 1/02; F16J 15/10

USPC ...... 174/650, 152 G, 153 G, 72 A, 135, 136, 174/77 R, 137 R, 138 R, 152 R, 151, 174/17 CT, 659; 16/2.1, 2.2; 277/312, 277/314, 602, 627, 625; 248/56
See application file for complete search history.

(56) References Cited

U.S. PATENT DOCUMENTS 5,499,823 A * 3/1996 Fukui ................... H02G 3/22
                                                          174/152 G
6,010,134 A * 1/2000 Katoh ............... B60R 16/0222
                                                          174/152 G (Continued)

FOREIGN PATENT DOCUMENTS

CN         103863193 A    6/2014
CN         112109637 B    6/2022

(Continued)

*Primary Examiner* — Angel R Estrada
(74) *Attorney, Agent, or Firm* — Plumsea Law Group, LLC (57) ABSTRACT

A sealing system and method for a mirror assembly of a vehicle is provided. The mirror assembly includes a wire harness and a gasket. A foam sheath is used to cover a portion of the wire harness, which is then routed through the gasket. This foam sheath is configured to fill any void between the wire harness and gasket. In some embodiments, a second foam sheath can be wrapped around the outside of the gasket as well as onto the first foam sheath. This creates a full seal outside of the gasket. Once this foam stack is created, the potential for wind noise caused by air traveling through the wire harness and gasket is substantially diminished. The foam stack also allows for the gasket to be deformed or bent while maintaining a reduction in noise.

20 Claims, 11 Drawing Sheets

(56) References Cited

U.S. PATENT DOCUMENTS

| | | | | |
|---|---|---|---|---|
| 6,088,875 | A * | 7/2000 | Ono | B60R 16/0222 |
| | | | | 16/2.2 |
| 6,225,562 | B1 * | 5/2001 | Fujishita | B60R 16/0222 |
| | | | | 174/152 G |
| 6,402,155 | B2 * | 6/2002 | Sakata | B60R 16/0222 |
| | | | | 174/152 G |
| 8,704,099 | B2 * | 4/2014 | Agusa | B60R 16/0222 |
| | | | | 174/152 G |
| 8,746,904 | B2 | 6/2014 | Herrmann et al. | |
| 10,457,345 | B2 | 10/2019 | Herrmann et al. | |
| 10,589,683 | B2 | 3/2020 | Bortolon et al. | |
| 11,515,064 | B2 * | 11/2022 | Gronowicz, Jr. | H02G 3/22 |
| 12,221,041 | B2 * | 2/2025 | May | B60R 16/0222 |

FOREIGN PATENT DOCUMENTS

| | | |
|---|---|---|
| CN | 112829680 B | 6/2022 |
| CN | 216684345 U | 6/2022 |
| CN | 217074191 U | 7/2022 |
| CN | 115042713 A | 9/2022 |
| CN | 115042714 A | 9/2022 |
| FR | 2978714 B1 | 3/2014 |
| JP | 6174979 B2 | 8/2017 |
| JP | 6182345 B2 | 8/2017 |
| JP | 6813397 B2 | 1/2021 |

* cited by examiner

SEALING SYSTEM AND METHOD FOR EXTERIOR MIRROR

BACKGROUND

The present disclosure generally relates sealing systems and methods for a side-view mirror provided at a side of, for example, a vehicle, and more particularly relates to the technical field of sealing systems which stabilize the fixed connection to the mirror and reduce wind noise.

Generally, a vehicle body is provided with various moving parts, for example, a trunk lid and a tailgate, as well as front and rear doors. The moving parts are mounted or otherwise secured within fixed mounting parts of the vehicle body in such a way as to be openable and closeable. Mirror assemblies for a vehicle side door generally includes a housing, which has a glass assembly mounted thereto, supported on a support arm affixed to the vehicle side door. Typically, the housing is configured to rotate around an inner base member of the support arm in a way that allows the housing to fold forward or rearward, which is useful during an impact or preventing damage when parked.

At the intersection between the two vehicle parts, gaps are inevitably formed between the moving parts and the fixed parts of the vehicle body. Such gaps are generally referred to as seal gaps. The seal gaps provide the necessary clearance to prevent interference between the moving part and the mounting part. However, while a vehicle is operating, air, water, or other fluids may enter through the seal gaps into the vehicle, and contribute to wind noise concerns. For example, such intrusive elements can damage the components, as well as contribute to undesirable noise during operation of the vehicle, particularly at high speeds.

There is a need in the art for a sealing assembly that reduces the acoustic interference that has been conventionally associated with the interface between the side mirror and vehicle body, and addresses the shortcomings described above.

SUMMARY

The disclosed embodiments provide methods and systems for improving performance of mirror assemblies in vehicles, and specifically to reduce noise that is generated from the side-view mirror connection mechanism.

In one aspect, a sealing system for a mirror assembly of a vehicle is disclosed. The system includes a mirror assembly including a wire harness and a gasket, where a first portion of the wire harness extends or passes through a tunnel formed in the gasket. In addition, the system includes a first foam sheath that encases or snugly surrounds at least the first portion of the wire harness inside of the tunnel in the gasket.

Another aspect provides a sealing system for a mirror assembly of a vehicle. The system includes a mirror assembly including a wire harness and a gasket, where the gasket protrudes from a rear surface of a plate body. The plate body is part of the mirror assembly. In addition, a first portion of the wire harness is routed from and through the plate body into a tunnel formed in the gasket. The system also includes a first foam sheath encasing both an exterior of the gasket and a second portion of the wire harness as it exits the gasket.

In yet another aspect, a method for reducing wind noise associated with a mirror assembly for a vehicle is disclosed. The method includes a step of encasing a first portion of a wire harness in a first foam sheath, and a step of routing the wire harness from a mirror housing, through a plate body, and to the vehicle. The method also includes a step of inserting the encased first portion into a tunnel formed in a gasket, the gasket protruding from a surface of the plate body.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
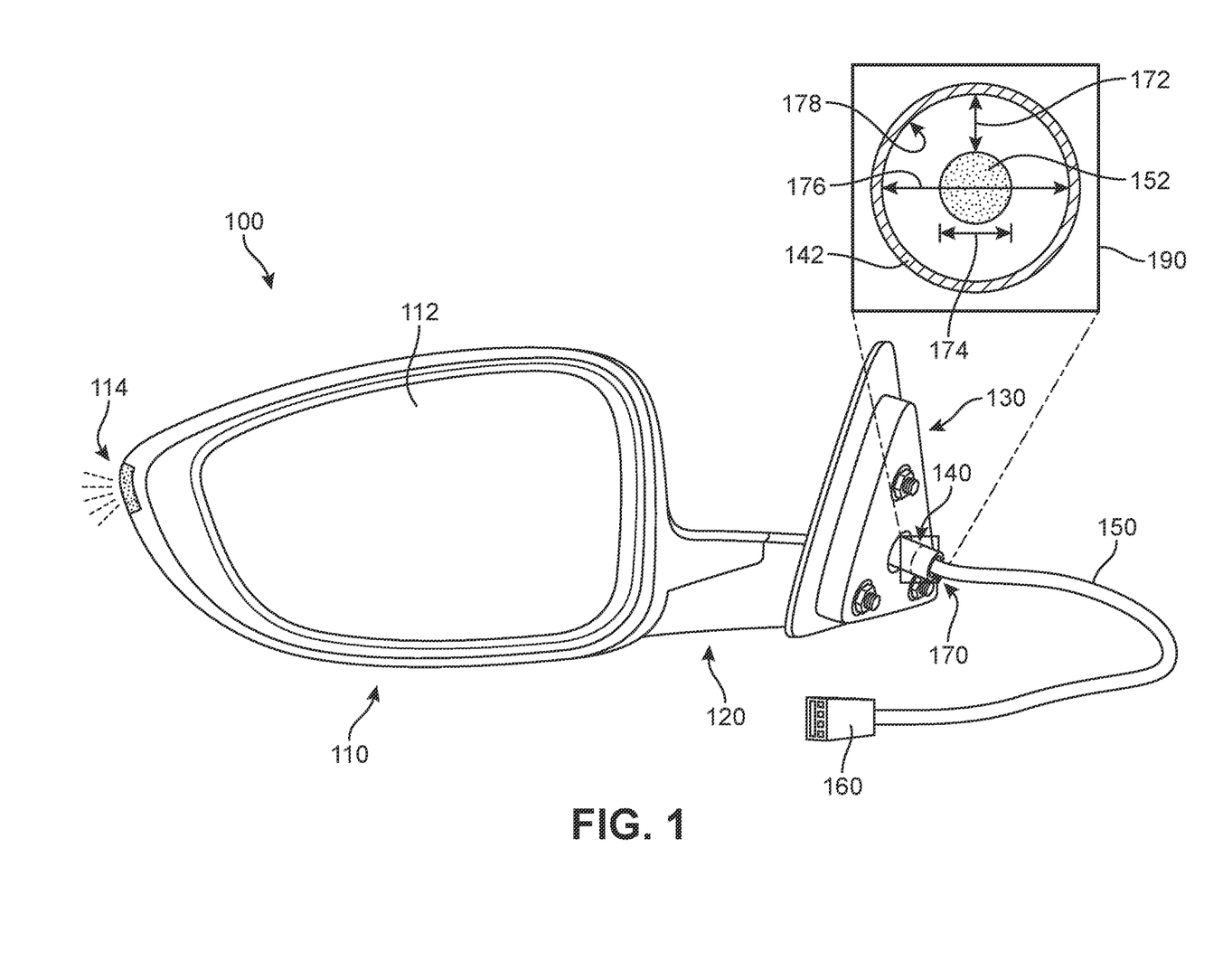
FIG. 1 presents a perspective schematic view of one example of a mirror assembly for a vehicle, according to an embodiment.

Referring to FIG. 1, an example of a conventional side-view mirror assembly ("assembly") 100 is shown for purposes of introduction. The assembly 100 includes a mirror housing 110 holding a mirror 112, a swivel arm 120, and a plate body 130, where the mirror housing 110 is joined to the plate body 130 via the swivel arm 120. As a general matter, the side-view mirror (or side mirror), also known as a wing mirror, is a mirror placed on the exterior of motor vehicles for the purposes of helping the driver see areas behind and to the sides of the vehicle, outside the driver's peripheral vision (in the "blind spot"). Almost all modern cars mount their side mirrors on the doors—normally at the A-pillar— rather than the wings (the portion of the body above the wheel well), though the proposed embodiments can be understood to be appropriate for either configuration. The mirror housing 110 is rotatable with respect to the plate body 130 by way of the swivel arm 120.

A side mirror is typically equipped for manual or remote vertical and horizontal adjustment so as to provide adequate coverage to drivers of differing height and seated position. Remote adjustment may be mechanical by means of Bowden cables, or may be electric by means of geared motors. The mirror glass may also be electrically heated and may include electrochromic dimming to reduce glare to the driver from the headlamps of following vehicles. Increasingly, the side mirror also incorporates the vehicle's turn signal repeaters 114, for example along the exterior of the mirror housing 110. These and other electronics or electrical features (e.g., heating elements, side mirror power adjustment motors, electrical connectors, mirror switches with directional controls, fused power mirror circuits, etc.) are thus dependent on the transfer of power from a location remote relative to the assembly 100. It may be appreciated that such elements must also receive and transmit control signals. A wire harness 150 is thereby routed from the various elements in or around the mirror housing 110, and passes through the swivel arm 120 and the thickness of the plate body 130. The wire harness 150 can then be guided toward the vehicle side through the opposite side of the plate body 130 via a gasket nipple ("gasket") 140 that protrudes from the plate body 130. The wire harness 150 may then continue outward for connection with the vehicle's electrical connector (e.g., via male-to-female or other connector arrangement, represented here by connector plug 160 at the end of the wire harness 150) for access to a power supply It can be observed in a schematic magnified view 190 in FIG. 1 that as the wire harness 150 passes through and out of an opening 170 formed in the gasket 140, a first diameter 174 of the wire harness 150 is smaller than a second diameter 176 of the opening 170. In other words, various segments of an outer circumference of the wire harness 150 can be spaced apart (gapped) from an interior surface 178 of the opening 170 of gasket 140, for example by an average distance 172 between the two components. Once the assembly 100 is connected to a car door or other region of a vehicle, this type of gap conventionally has been associated with a high potential to cause wind noise while driving due to air leaks through small gaps, and/or instability of the wire harness 150 or distortion of the gasket 140. In other words, though the wire harness 150 arrives at its destination for connection to the vehicle system, the body of the wire harness can be jostled or otherwise move relative to the gasket 140 and plate body 130.

As described herein, the proposed systems and methods address this problem by the incorporation of foam into a portion of the assembly 100. In different embodiments, the systems can use EPT (EPDM) foam, a soft-closed cell foam with excellent sealing properties. The closed cell structure gives excellent water and air tightness, even under severe conditions, with low compression load. However, in other embodiments, different sealing materials may be alternatively used or mixed in with the EPT foam, including but not limited to other elastomers, or long-chain polymers which are capable of cross-linking (vulcanization), including TPE, NBR, HNBR, FKM, CR, VMQ, FVMQ, ACM, AEM, SBR, AU/EU, and NR. The use of a foam sheath as described herein can serve to reinforce the gasket and stabilizes and seals the gasket opening even when the gasket experiences bending, warping, breaking, or other damage that can increase the likelihood of wind-related noise being generated through the opening.

Thus, in different embodiments, the seal components (foam sheaths) described herein are formed entirely or in part of a soft flexible material, for example a single unitary rubber material such as EPT. It can be appreciated that use of a single unitary material allows for simple open/close tooling to manufacture the foam sheath that typically require complex tooling to properly achieve a sealing condition between a moving wire harness, a gasket, and the plate body. In some embodiments, a tooling arrangement can include an injection mold. For example, the injection mold can include an upper mold half and a lower mold half and having mutually spaced upper and lower cavity wall portions defining a molding cavity therebetween. The material for the foam sheath may be injected into the molding cavity, and when cured, the upper mold half (or the lower mold half), for example, can be moved to an open position and the seal member can be released from the lower mold half.

With this construction of the foam sheath, the foam sheath can permit some movement of the wire harness relative to the gasket, while maintaining a seal around the parts. In some embodiments, a distal side of the foam sheath (closest to the plate body) is flush against a rear surface (the side facing the vehicle) of the plate body, creating an enclosed cell on the proximal side of the plate body. With this arrangement, the foam sheath can limit deflection of the gasket during movements of the wire harness.

For purposes of convenience, the description makes reference to a set of axes. As a general matter, the term "longitudinal axis" as used throughout this detailed description and in the claims refers to an axis that extends in a longitudinal direction, which is a direction extending the length of a component, such as the length of the wire harness between a first end in the mirror housing and a second end that will be connected to the vehicle. In addition, the term "vertical axis" as used throughout this detailed description and in the claims refers to an axis that extends in a vertical direction, for example in FIG. 1 is a direction running from the top of the mirror housing to the bottom of the mirror housing. Similarly, the term "lateral axis" as used throughout this detailed description and in the claims refers to an axis that extends in a lateral direction, which is a direction running a width of each component. Each axis of the three axes may be understood to be orthogonal relative to the other two axes.

Furthermore, the description makes reference to distal and proximal directions (or portions). As used herein, the distal direction is a direction outward or oriented away from what would be a center of the vehicle to which the assembly is connected. Also, the proximal direction is a direction oriented toward a center of the vehicle to which the mirror housing is connected. Thus, a distal side or region refers to a portion of a component that is disposed further from the center and a proximal side or region refers to a portion of a component that is disposed nearer to the center. In this case, the mirror housing is most distal, and the connector plug of the wire harness would be most proximal.

Multiple embodiments of the proposed systems and methods are described herein. As a first example, moving to FIG. 2, a first embodiment is illustrated in the larger context of a first mirror assembly 200 that includes a first mirror housing 210, a first mirror 212, a first swivel arm 220, and a first plate body 230. Referring to the enlarged view of a region 290 in FIG. 2, it can be observed that a first wire harness 250 emerges from a first gasket 240 protruding from a rear surface 232 of the first plate body 230. First gasket 240 can refer to a nipple gasket, pipe gasket, flare gasket, or other tubular type gasket or seal. The first foam sheath 260 is presented as encasing or otherwise surrounding the exterior of the protruding first gasket 240 as well as a first segment 252 of the first wire harness 250. The stable enclosure provided by the first foam sheath 260 can substantially reduce the movement of the wire harness relative to the interior of the gasket and plate body. In addition, the material of first foam sheath 260 can further mitigate noise by absorbing sound before it travel from the direction of the mirror housing to the vehicle interior.

Figure 2:
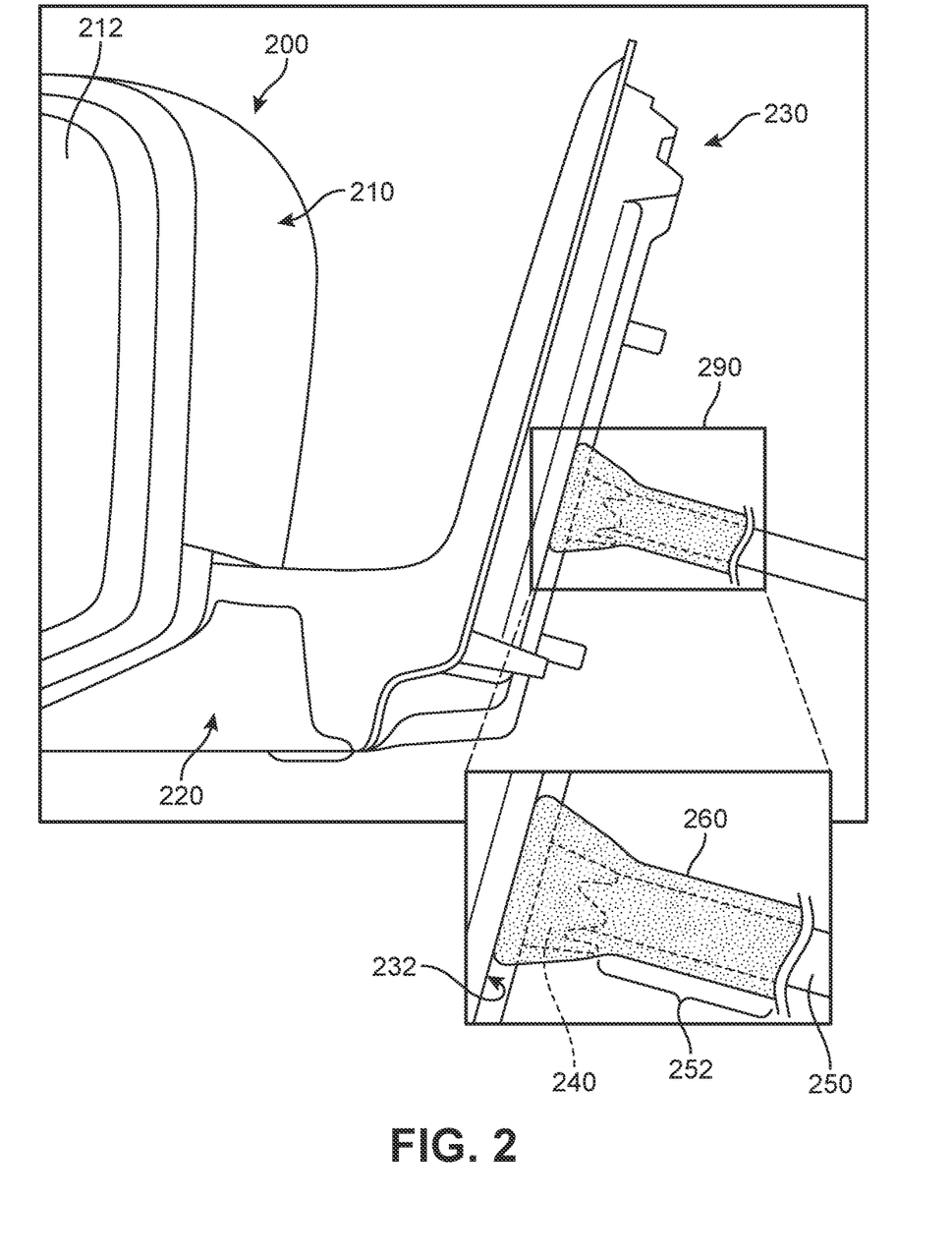
FIG. 2 is a partial view of a mirror assembly in which one embodiment of the sealing system has been incorporated, according to an embodiment.
Figure 3A:
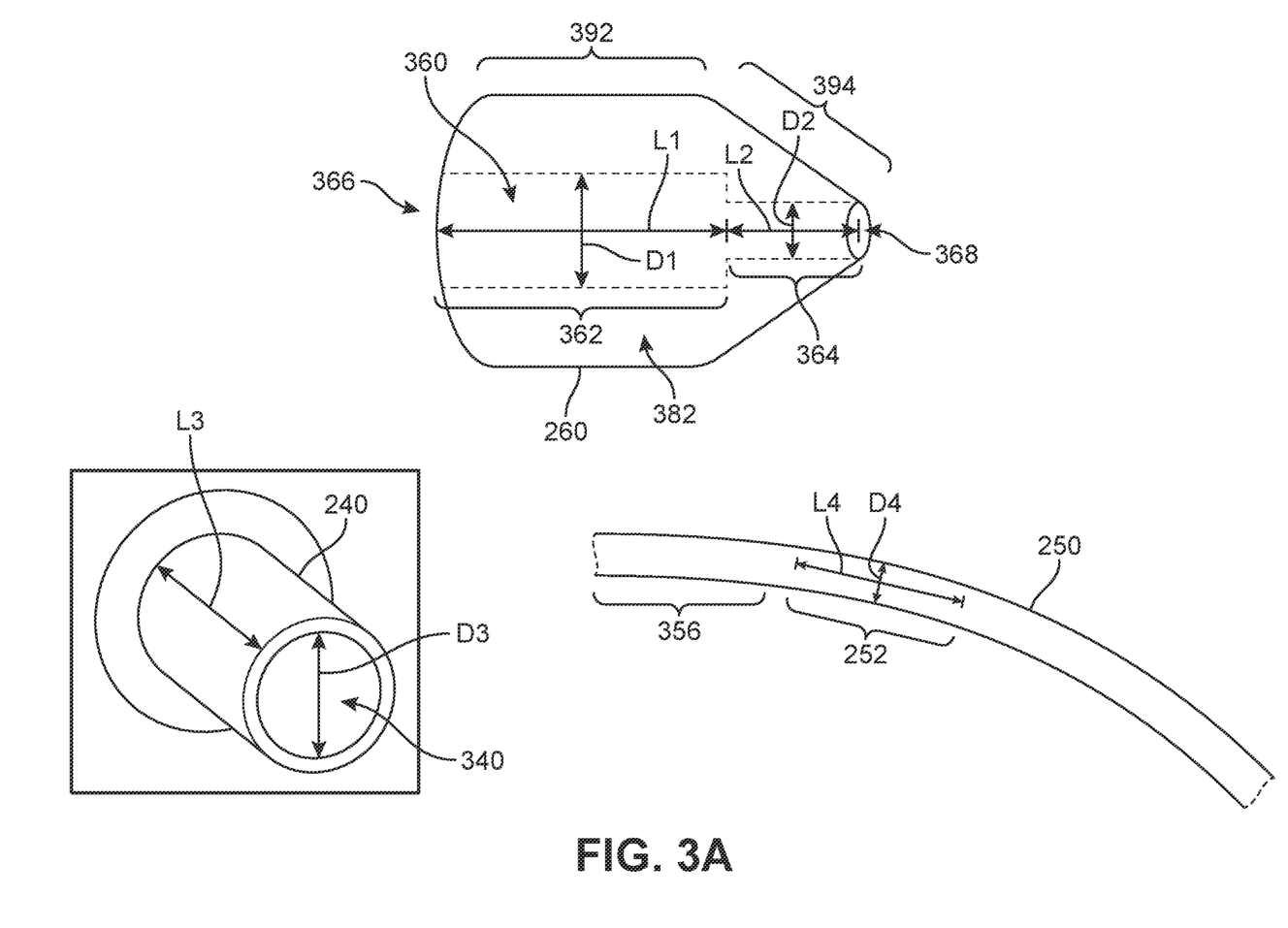
FIG. 3A is an exploded view showing some components of the sealing system of FIG. 2, or portions thereof, according to an embodiment.
Figure 3B:
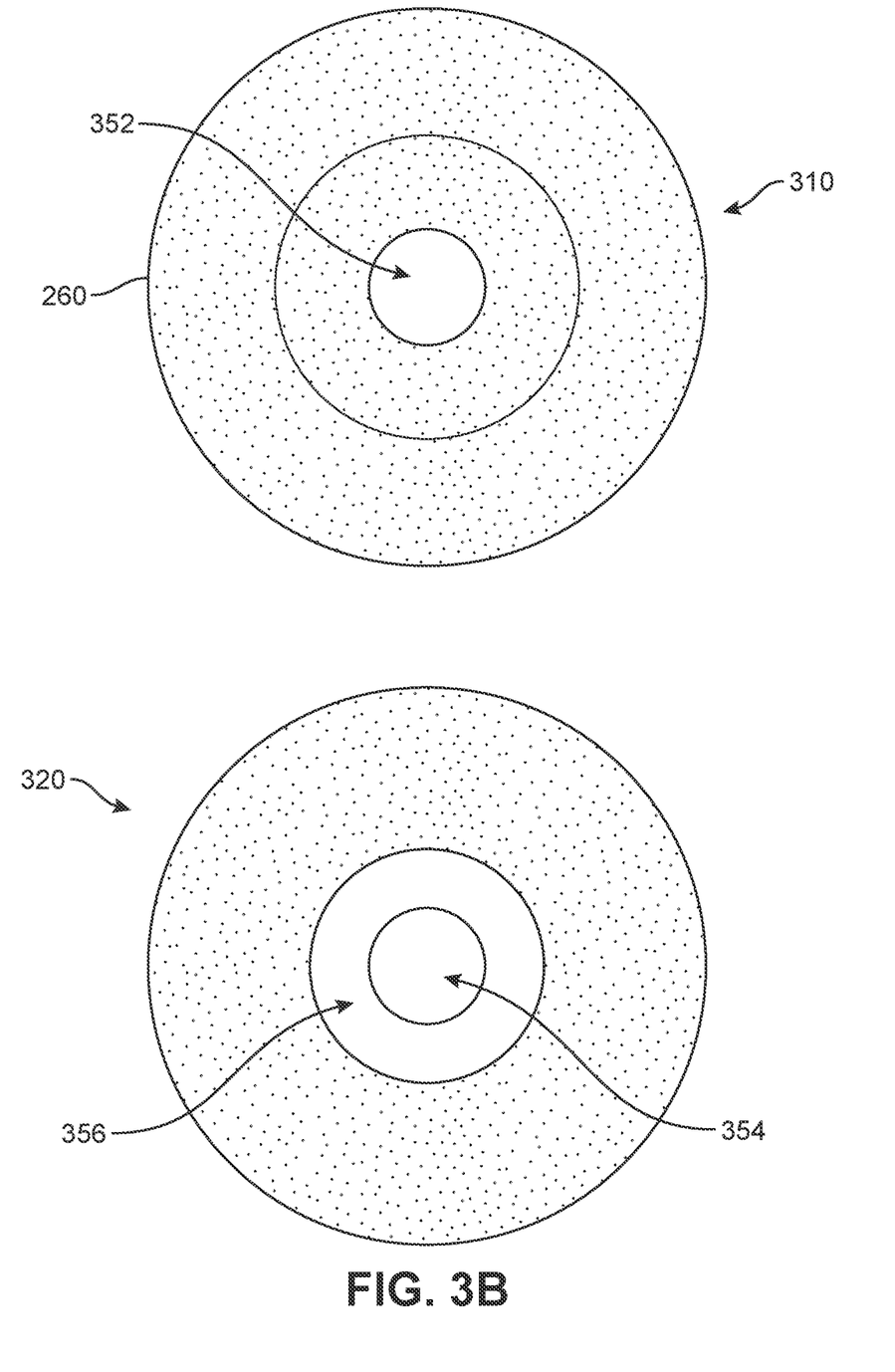
FIG. 3B is a schematic front-facing and rear-facing view of the sealing system of FIG. 2, according to an embodiment.

Additional details regarding the embodiment shown in FIG. 2 are now provided with reference to FIGS. 3A-4B. In different embodiments, the first foam sheath 260 can be sized and dimensioned to snugly wrap around and form a seal with the two mirror assembly components (i.e., the wire harness and the gasket). An exploded overview of some of the components of the sealing system are now shown in FIG. 3A. As shown in FIG. 3A, the first foam sheath 260 can comprise a foam-based outer sleeve 382 through which a channel 360 extending from a first opening 366 (toward the side in contact with the plate body) to a second opening 368 (the side where the wire harness emerges) is formed. The channel 360 can be sized and dimensioned to provide a flush and tight contact with the exterior surfaces of the first gasket 240 and the first segment 252 of the first wire harness 250. In FIG. 3A, for purposes of illustration, the first gasket 240 has a substantially cylindrical three-dimensional shape, with a third diameter D3 and a third length L3, forming or otherwise surrounding a hollow tunnel 340 that extends its length L3. Furthermore, the first wire harness 250 has a second segment 356 that is configured to be encased or extend within the tunnel 340, joined to the first segment 252 that will exit the opening of the tunnel 340 toward the vehicle connection point.

Thus, in different embodiments, the first foam sheath 260 can include corresponding internal structural features that accommodate the arrangement and sizing of the two components. For example, the channel 360 of first foam sheath 260 includes two distinct sections, including a first section 362 and a second section 364, that are in fluid communication with one another. In addition, first opening 366 leads to the first section 362, and the second section 364 leads out to the second opening 368 as a continuous passageway. In some embodiments, a first length L1 of the first section 362 can be approximately equal to the third length L3 of the first gasket 240. Similarly, in some embodiments, a second length L2 of the second section 364 can be approximately equal to a fourth length L4 of the first segment 252. Furthermore, in different embodiments, a first diameter D1 of the first section 362 is approximately equal to third diameter D3 of the first gasket 240, and a second diameter D2 of the second section 364 is approximately equal to a fourth diameter D4 of the first segment 252. In some embodiments, when the first foam sheath 260 is isolated, the first diameter D1 can be slightly smaller than the third diameter D3, and/or the second diameter D2 can be slightly smaller than the fourth diameter D4, to allow for the rubber or elastic quality of the material to stretch when applied to the exterior of the gasket and/or wire harness and provide a tight seal. In some embodiments, the interior surfaces of the first section 362 and/or second section 364 can be understood to be in flush, compressive, contact with the exterior surfaces of the gasket and/or wire harness.

Figure 4A:
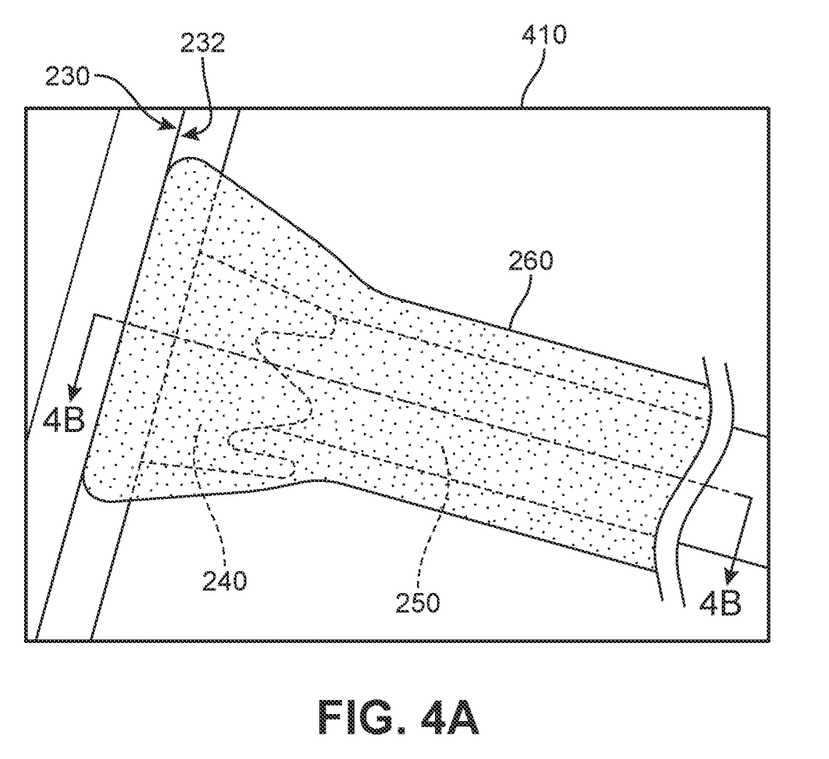
FIG. 4A is a schematic view of the sealing system of FIG. 2, according to an embodiment.
Figure 4B:
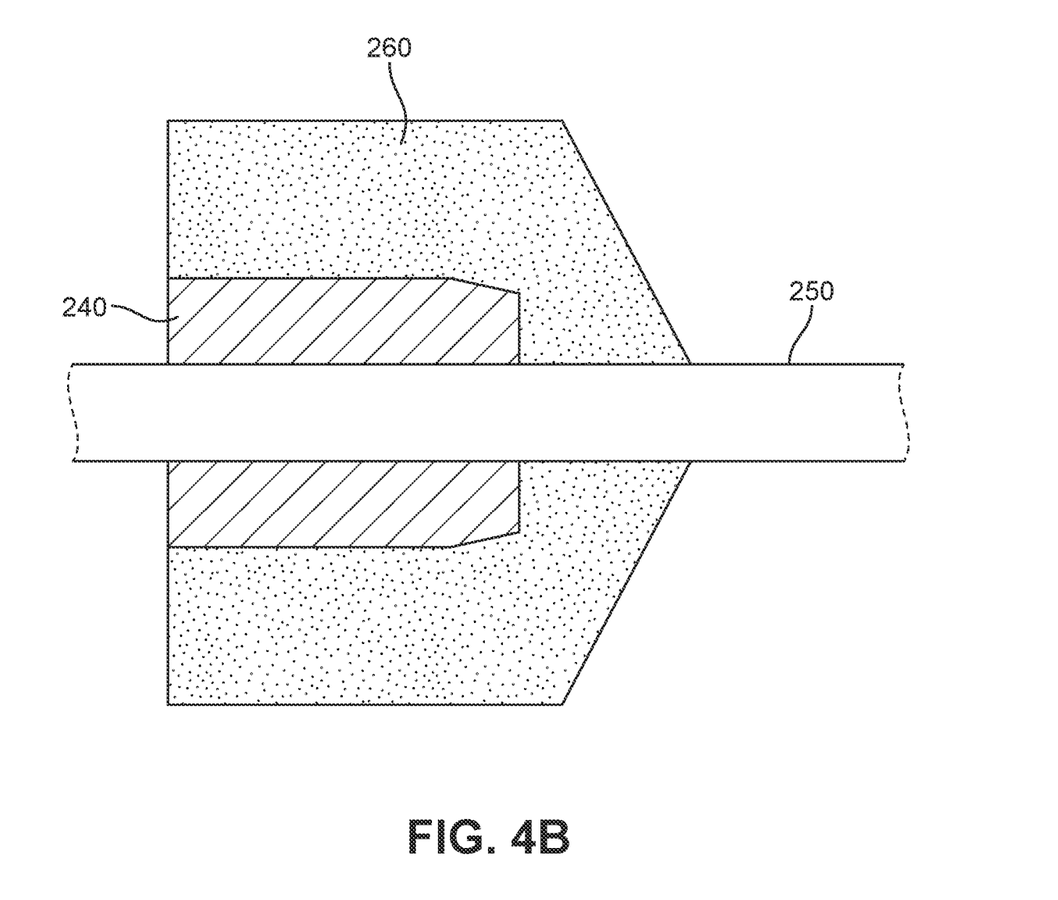
FIG. 4B is a cross-sectional view of the sealing system of FIG. 4A, according to an embodiment.

In some embodiments, the outer shape of the first foam sheath 260 can comprise a substantially regular cylindrical shape. However, in other embodiments, to better promote a fit within the vehicle's door compartment, the first foam sheath 260 can include a substantially cylindrical portion (associated with a gasket sheath portion 392) and a tapered portion (associated with a wire harness sheath portion 394). For example, the tapered portion can include a semi-conical shape. Thus, when viewed from a proximal end 310 (relative to the vehicle), the outer circumference of the sheath may be smaller, and include only the thickness of the first foam sheath 260 and a first portion 352 of the encased wire harness. In contrast, when viewed from a distal end 320 (relative to the vehicle), the outer circumference is larger, accommodating both a second portion 354 of the wire harness as well as a wall thickness 356 of the gasket surrounding the first segment of the wire harness. This difference in circumference is also illustrated in FIGS. 4A and 4B. FIG. 4B is a schematic cross-sectional view of a first sealing system 410 of FIG. 4A, taken along the line A-A. In some embodiments, the diameter of the first foam sheath 260 can be seen to be larger toward or around the first gasket 240, and narrower or smaller toward or around the first wire harness 250. In some embodiments, the exterior of the first foam sheath 260 can have a wider base toward the rear (proximal) surface 232 of the first plate body 230, and narrower in the direction of the exiting first wire harness 250.

Figure 5:
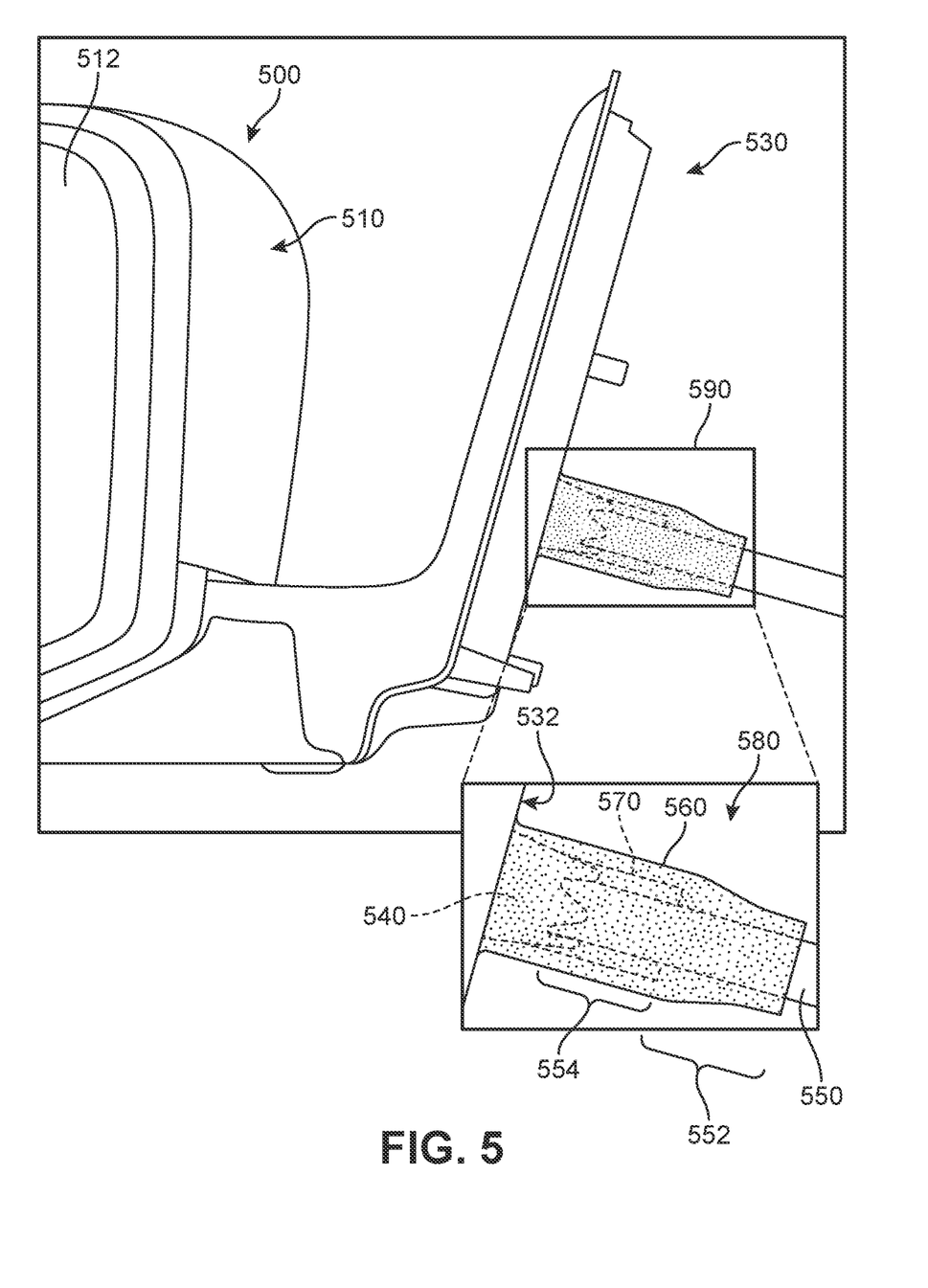
FIG. 5 is a partial view of a mirror assembly in which another embodiment of the sealing system has been incorporated, according to an embodiment.

A second embodiment of the proposed systems and methods is shown with reference to FIG. 5 that further reduces wind noise by sealing gaps between the gasket and the wire harness surfaces. In this example, the second embodiment is illustrated in the larger context of a second mirror assembly 500 that includes a second mirror housing 510, a second mirror 512, a second swivel arm 520, and a second plate body 530. Referring to the enlarged view of a region 590 in FIG. 5, it can be observed that a second wire harness 550 emerges from a second nipple gasket ("second gasket") 540 that protrudes from a rear surface 532 of the second plate body 530. A seal assembly 580 comprising both a second foam sheath 560 and a third foam sheath 570 is depicted. The second foam sheath 560 encases or otherwise surrounds the exterior of the protruding second gasket 540 as well as a first region 552 of the second wire harness 550. As noted earlier, the stable enclosure provided by the second foam sheath 560 can substantially reduce the movement of the wire harness relative to the interior of the gasket and plate body. In addition, the material of second foam sheath 560 can further mitigate noise by absorbing sound before it travel from the direction of the mirror housing to the vehicle interior. In addition, the third foam sheath 570 encases or otherwise surrounds a second region 554 of the second wire harness 550 that extends from within the gasket and partially out of the gasket. In other words, the seal assembly 580 incorporates two different foam elements that each contribute to the stability of the components.

Figure 6:
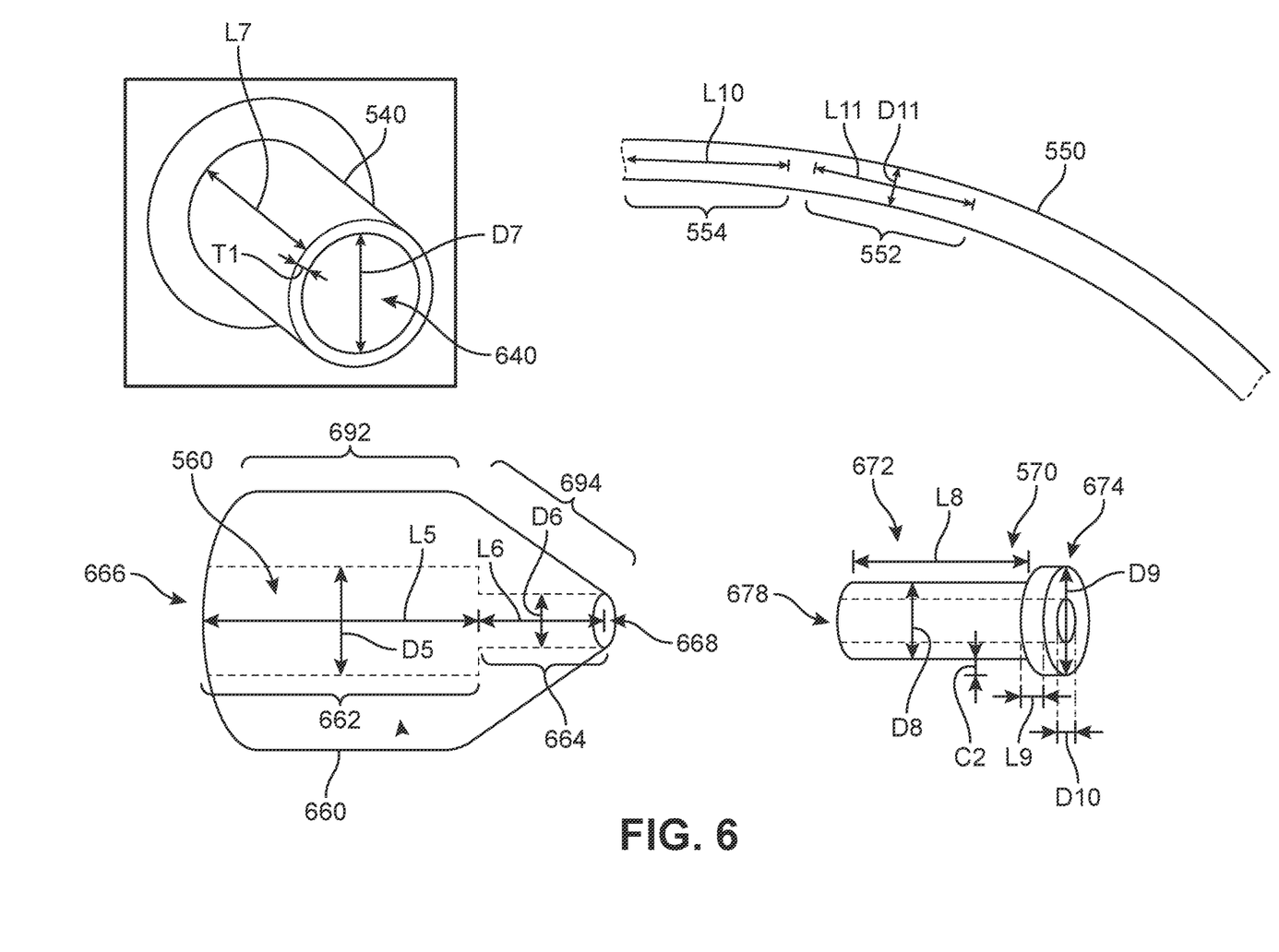
FIG. 6 is an exploded view showing some components of the sealing system of FIG. 5, or portions thereof, according to an embodiment.
Figure 7A:
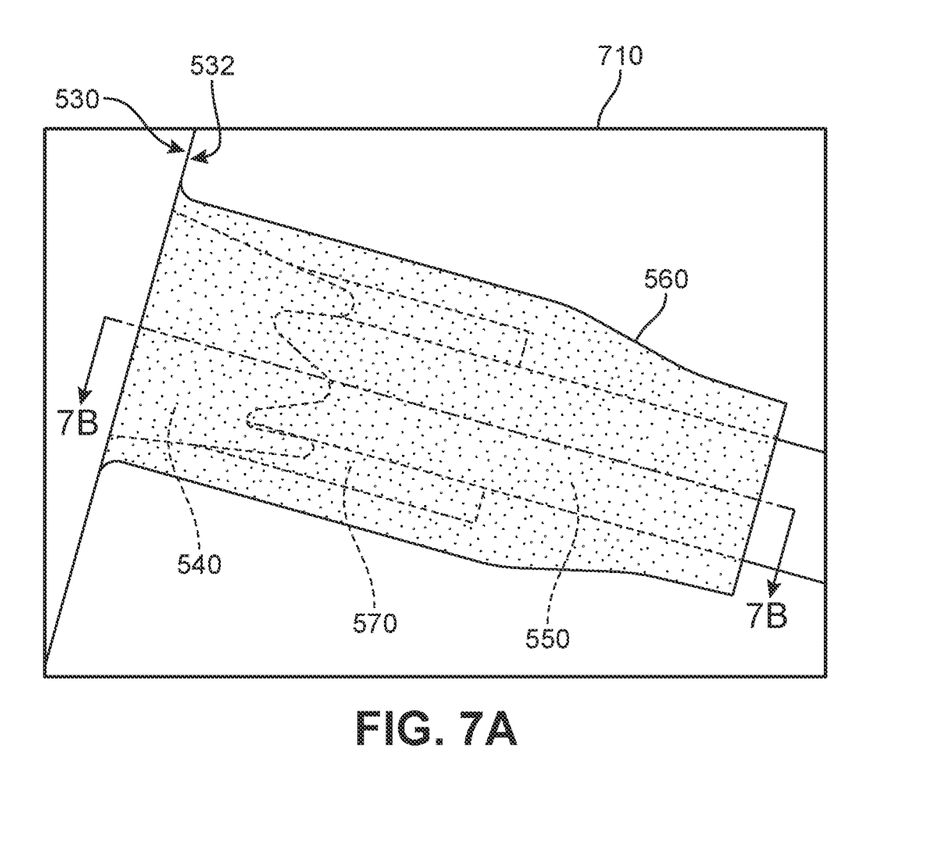
FIG. 7A is a schematic view of the sealing system of FIG. 5, according to an embodiment.
Figure 7B:
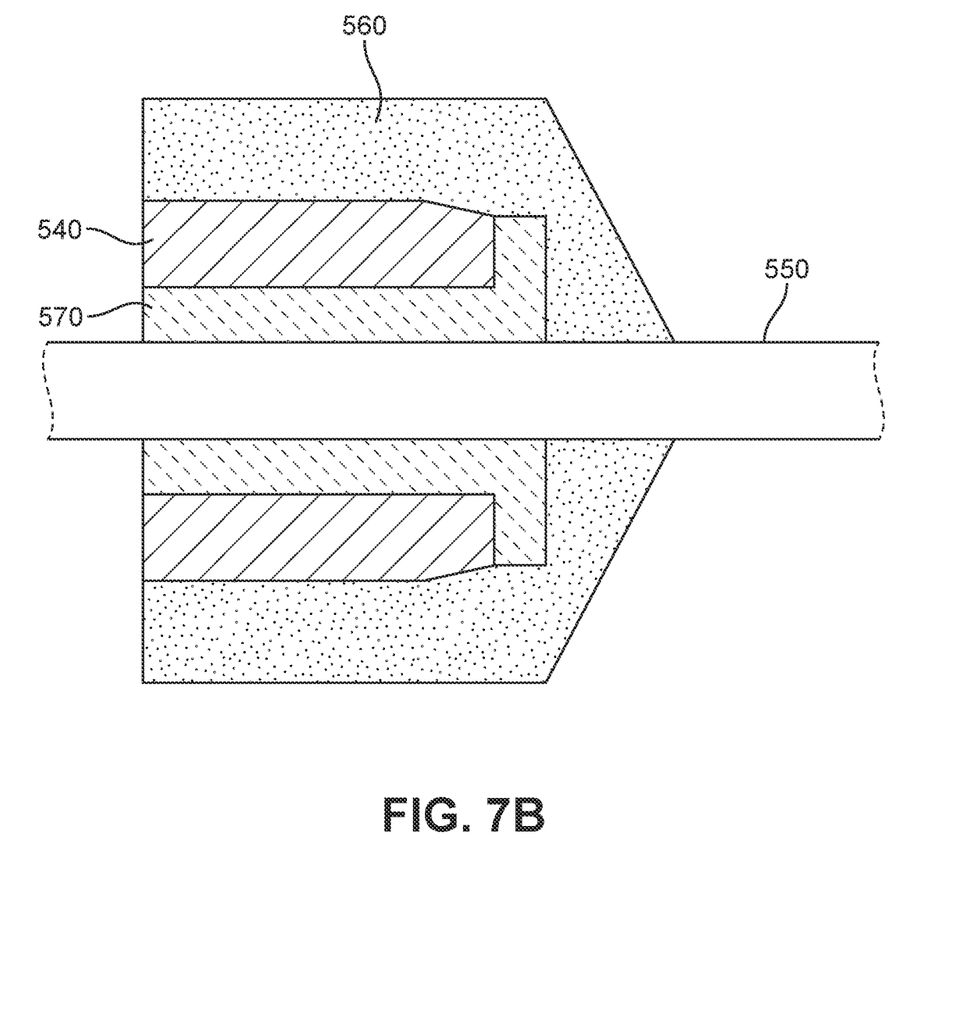
FIG. 7B is a cross-sectional view of the sealing system of FIG. 7A, according to an embodiment.

Additional details regarding the embodiment shown in FIG. 5 are now provided with reference to FIGS. 6-7B. In different embodiments, the second foam sheath 560 can be sized and dimensioned to snugly wrap around and form a seal with the two mirror assembly components (i.e., the wire harness and the gasket), as well as the third foam sheath 570. An exploded overview of some of the components of the sealing system are now shown in FIG. 6. As shown in FIG. 6, the second foam sheath 560 can have a substantially solid outer sleeve 682 through which a channel 660 extending from a first opening 666 (toward the side in contact with the plate body) to a second opening 668 (the side where the wire harness emerges) is formed. The channel 660 can be sized and dimensioned to provide a flush and tight contact with the exterior surfaces of the second gasket 540, the first region 552 of the second wire harness 550, and a peripheral portion 674 of the third foam sheath 570 when the components are assembled. In FIG. 6, for purposes of this example, the second gasket 540 has a substantially cylindrical three-dimensional shape, with a seventh diameter D7 and a seventh length L7, forming or otherwise surrounding a hollow tunnel 640 that extends its the seventh length L7.

In the second embodiment, the third foam sheath 570 can be slid onto or otherwise applied to an exterior surface of the second region 554 of the second wire harness 550. Thus, a tenth length L10 of the second region 554 can be understood to be approximately equal to the total length of the third foam sheath 570, which includes an eighth length L8 of a body portion 672 and a ninth length L9 of the peripheral portion 674. In different embodiments, the two portions (body portion 672 and peripheral portion 674) can be associated with different dimensions to form a seal (adhering) with the second gasket 540. Thus, while the eighth length L8 of the body portion 672 is substantially equal to the seventh length L7 of the second gasket 540, the peripheral portion 674, including a lip that surrounds the proximal side of the second gasket 540, is configured for snugly pressing against the outer opening of the second gasket 540 and around the second region 552 of the second wire harness 550. A difference C1 in circumference between the body portion 672 and the peripheral portion 674 can also be substantially similar to a thickness T1 of the outer wall of the second gasket 540, allowing for a substantially flush seal between the two surfaces when joined.

In this case, the body portion 672 is configured for snug insertion into the tunnel 640, and so an eighth diameter D8 of the body portion 672 can be substantially similar to the seventh diameter D7, allowing the two to be pressed tightly together when the third foam sheath 570 is pushed into the tunnel 640. Similarly, in some embodiments, a tenth diameter D10 of a through-hole 678 that extends the full length of the third foam sheath 570 is substantially similar to an eleventh diameter D11 of the second wire harness 550, such that the wire harness can be understood to extend and be held snugly inside the third foam sheath 570. In other words, in some embodiments, the third foam sheath 570 can be held in place around a portion of the wire harness due to the diameters being similar. However, in other embodiments, the diameters (D10 and D11) can vary slightly, to allow for some give-and-take of movement of the wire harness through the third foam sheath 570 while the third foam sheath 570 remains substantially steady and/or maintains its position relative to the second gasket 540 itself, ensuring a stable seal.

Once the second wire harness 550 (encased along second region 554 by the third foam sheath 570) has been inserted into the second gasket 540, in different embodiments, the second foam sheath 560 can also be applied. In other words, once the three components (second gasket 540, third foam sheath 570, and second wire harness 550) have been assembled, the second foam sheath 560 can encapsulate the assembled set of components. In FIG. 6, a cross-section of an example of the second foam sheath 560 is shown. In different embodiments, the second foam sheath 560 can include corresponding internal structural features that accommodate the arrangement and sizing of the assembled three components. For example, the channel 660 of second foam sheath 660 includes two distinct sections, including a first section 662 and a second section 664, that are in fluid communication with one another. In this case, first opening 666 leads to the first section 662, and the second section 664 leads out to the second opening 668, providing a continuous passageway. In some embodiments, a fifth length L5 of the first section 662 can be approximately equal to a combined length of the seventh length L7 of the second gasket 540 and the ninth length L9 of the peripheral portion 674 of the third foam sheath 570. Thus, the two pieces will be held together and encased within a gasket sheath portion 692 of the second foam sheath 660 in a substantially flush and snug arrangement. Similarly, in different embodiments, the first region 552 of the second wire harness 550, with an eleventh length L11, can be encased in an adjoining wire harness sheath portion 694 with a sixth length L6 that is the same as eleventh length L11. The first region 552 can then extend out of the peripheral portion 674 of the third foam sheath 570 into the seal provided by the second foam sheath 560.

In addition, in some embodiments, a sixth diameter D6 of the second section 664 is substantially similar to the eleventh diameter D11 of the second wire harness 550. In some embodiments, when the second foam sheath 560 is isolated, the fifth diameter D5 can be slightly smaller than or the same size as the seventh diameter D7, the fifth diameter D5 can be slightly smaller than or the same size as the ninth diameter D9, and/or the sixth diameter D6 can be slightly smaller than or the same size as the eleventh diameter D11, to allow for the rubber or elastic quality of the material to stretch when applied to the exterior of the gasket and/or wire harness and provide a tight, gripping seal. In some embodiments, the interior surfaces of the first section 662 and/or second section 664 can be understood to be in flush, compressive, contact with the exterior surfaces of the gasket, third foam sheath, and/or wire harness.

In some embodiments, the outer shape of the second foam sheath 660 can comprise a substantially regular cylindrical shape. However, in other embodiments, to better promote a fit within the vehicle's door compartment, the second foam sheath 660 can include a substantially cylindrical portion (associated with gasket sheath portion 692) and a tapered portion (associated with wire harness sheath portion 694). For example, the tapered portion can include a semi-conical shape. Thus, when viewed from a proximal end (relative to the vehicle), the outer circumference of the third foam sheath may be smaller, and include only the thickness of the third foam sheath and a portion of the encased wire harness. In contrast, when viewed from a distal end (relative to the vehicle), the outer circumference is larger, accommodating both another portion of the wire harness, the thickness of the third foam sheath, and a wall thickness of the gasket surrounding the body portion of the third foam sheath.

This arrangement is also illustrated in FIGS. 7A and 7B. FIG. 7B is a schematic cross-sectional view of a second sealing system 710 of FIG. 7A, taken along the line B-B. In some embodiments, the diameter of the second foam sheath 560 can be seen to be larger toward or around the second gasket 540, and narrower or smaller toward or around the second wire harness 550. In some embodiments, the exterior of the second foam sheath 560 can have a wider base toward the rear surface 532 of the second plate body 530, and narrower in the direction of the exiting second wire harness 550. Furthermore, FIG. 7B more clearly shows the shape of the third foam sheath 570, in a cross-sectional along its middle comprising two "L" shaped pieces, with each of the two segments of the L belonging to either the body portion or the peripheral portion, and the wire harness routed through the gap between the two segments. In some alternate embodiments, the third foam sheath 570 can be independently incorporated to provide a single-element seal system (e.g., as a third embodiment), without the second foam sheath 560.

Figure 8:
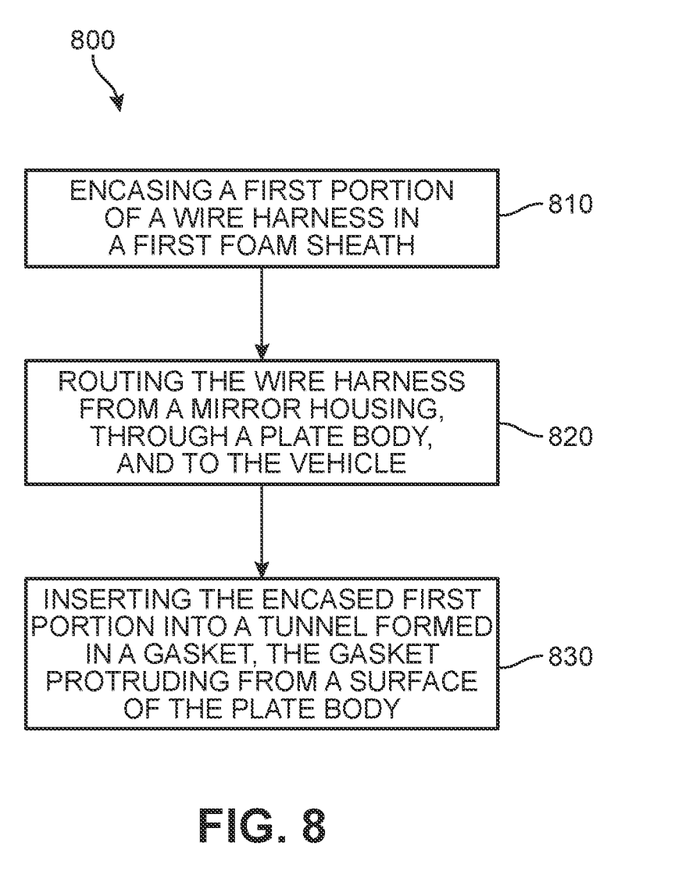
FIG. 8 is a flow chart depicting a method of reducing wind noise associated with a mirror assembly for a vehicle, according to an embodiment.

FIG. 8 is a flow chart illustrating an embodiment of a method 800 of reducing wind noise associated with a mirror assembly for a vehicle. At 810, the method 800 includes encasing a first portion of a wire harness in a first foam sheath, and at 820, the method 800 includes routing the wire harness from a mirror housing, through a plate body, and to the vehicle. At 830, the method 800 includes inserting the encased first portion into a tunnel formed in a gasket, the gasket protruding from a surface of the plate body. In different embodiments, the method 800 may include additional processes or aspects. In one example, the method can also include encasing an exterior of the gasket and a second portion of the wire harness as it exits the tunnel in a second foam sheath. In some embodiments, the second foam sheath further encases a peripheral portion of the first foam sheath. In another example, the second foam sheath can be sized and dimensioned so as to fit snugly within the tunnel.

In different embodiments, a foam sheath can be applied to portions of the wire harness, and the wire harness then routed through the gasket. The foam sheath is configured to fill any void between the wire harness and gasket that would otherwise contribute to noise generated by wind traveling through the gap(s). In some embodiments, a second foam sheath can also then be wrapped around the outside of the gasket and onto the harness-encased portion foam. This creates a full seal outside of the gasket. This type of seal using a "foam stack" eliminates the potential for wind noise caused by air traveling through the wire harness and gasket nipple. The additional foam sheath, stacked around the gasket, can increase the stability of the components and maintain seals within the gaps between the gasket and wire harness that would otherwise occur over time and are associated with vehicle noise. This foam stack arrangement allows for the gasket to be deformed or bent over time—which would otherwise lead to gaps between the components—while maintaining the seal, thereby improving the function of the mirror assembly by preventing wind from traveling through the system, including wear and tear or everyday use of the parts of the mirror assembly.

The foregoing disclosure of the preferred embodiments has been presented for purposes of illustration and description. It is not intended to be exhaustive or to limit the embodiments to the precise forms disclosed. Many variations and modifications of the embodiments described herein will be apparent to one of ordinary skill in the art in light of the above disclosure.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Further, in describing representative embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the present embodiments.

The invention claimed is:

1. A sealing system for a mirror assembly of a vehicle, the sealing system comprising:
    a mirror assembly including a wire harness and a gasket, a first portion of the wire harness extending through a tunnel formed in the gasket; and
    a first foam sheath encasing at least the first portion of the wire harness inside of the tunnel in the gasket; wherein, said first foam sheath is a pre-formed foam sheath and said first portion of said wire harness and said pre-formed first foam sheath are jointly inserted into said tunnel.

2. The sealing system of claim 1, wherein the mirror assembly further comprises a plate body, wherein the wire harness is routed from the plate body through the gasket.

3. The sealing system of claim 1, wherein the mirror assembly further comprises a mirror housing, wherein the wire harness is routed from the mirror housing to the vehicle.

4. The sealing system of claim 1, wherein the gasket is a substantially cylindrical nipple gasket.

5. The sealing system of claim 1, wherein the first portion of the wire harness is spaced apart from an interior surface of the tunnel by a thickness of the first foam sheath.

6. The sealing system of claim 1, wherein the first foam sheath includes EPT foam.

7. The sealing system of claim 1, wherein the first foam sheath fills all space between the first portion of the wire harness and an interior of the tunnel.

8. The sealing system of claim 1, further comprising a second foam sheath encasing both an exterior of the gasket and a second portion of the wire harness as it exits the gasket.

9. The sealing system of claim 8, wherein the second foam sheath provides a continuous seal around the gasket and the second portion of the wire harness.

10. A sealing system for a mirror assembly of a vehicle, the sealing system comprising:
    a mirror assembly including a wire harness and a gasket, the gasket protruding from a rear surface of a plate body, wherein a first portion of the wire harness is routed from the plate body through a tunnel formed in the gasket; and
    a first foam sheath encasing both an exterior of the gasket and a second portion of the wire harness as it exits the gasket.

11. The sealing system of claim 10, wherein the mirror assembly further comprises a mirror housing, wherein the wire harness is routed from the mirror housing to the vehicle.

12. The sealing system of claim 10, wherein the gasket is a substantially cylindrical nipple gasket.

13. The sealing system of claim 10, wherein the first foam sheath includes EPT foam.

14. The sealing system of claim 10, further comprising a second foam sheath encasing at least the first portion of the wire harness inside of the tunnel in the gasket.

15. The sealing system of claim 14, wherein the first portion of the wire harness is spaced apart from an interior surface of the tunnel by a thickness of the second foam sheath.

16. The sealing system of claim 14, wherein the second foam sheath fills all space between the first portion of the wire harness and the interior of the tunnel.

17. A method of reducing wind noise associated with a mirror assembly for a vehicle, the method comprising:
- encasing a first portion of a wire harness in a first foam sheath;
- routing the wire harness from a mirror housing, through a plate body, and to the vehicle; and
- inserting the encased first portion into a tunnel formed in a gasket, the gasket protruding from a surface of the plate body.

18. The method of claim 17, further comprising encasing an exterior of the gasket and a second portion of the wire harness as it exits the tunnel in a second foam sheath.

19. The method of claim 17, wherein the second foam sheath further encases a peripheral portion of the first foam sheath.

20. The method of claim 17, wherein the second foam sheath is sized and dimensioned so as to fit snugly within the tunnel.

* * * * *